US011592067B2

(12) United States Patent
Arnault et al.

(10) Patent No.: US 11,592,067 B2
(45) Date of Patent: Feb. 28, 2023

(54) FILTRATION DEVICE AND USE OF SAID DEVICE FOR SEPARATING AND COLLECTING BRAKE DUST

(71) Applicants: SOGEFI FILTRATION, Guyancourt (FR); TALLANO TECHNOLOGIE, Boulogne Billancourt (FR)

(72) Inventors: Nicolas Arnault, Chaville (FR); Grégory Gauthe, La Frette sur Seine (FR)

(73) Assignees: SOGEFI FILTRATION, Guyancourt (FR); TALLANO TECHNOLOGIE, Boulogne Billancourt (FR)

( * ) Notice: Subject to any disclaimer, the term of this patent is extended or adjusted under 35 U.S.C. 154(b) by 415 days.

(21) Appl. No.: 16/760,238

(22) PCT Filed: Nov. 2, 2018

(86) PCT No.: PCT/FR2018/052710
§ 371 (c)(1),
(2) Date: Apr. 29, 2020

(87) PCT Pub. No.: WO2019/086814
PCT Pub. Date: May 9, 2019

(65) Prior Publication Data
US 2020/0355230 A1  Nov. 12, 2020

(30) Foreign Application Priority Data

Nov. 6, 2017 (FR) ........................................ 1760377

(51) Int. Cl.
*F16D 65/00* (2006.01)
*B01D 46/00* (2022.01)
(Continued)

(52) U.S. Cl.
CPC ..... *F16D 65/0031* (2013.01); *B01D 46/0002* (2013.01); *B01D 46/0031* (2013.01);
(Continued)

(58) Field of Classification Search
CPC ............ F16D 65/0031; B01D 46/0031; B01D 46/0002; B01D 46/0034; B01D 46/0045;
(Continued)

(56) References Cited

U.S. PATENT DOCUMENTS 3,257,783 A * 6/1966 Baker ....................... F16T 1/38
137/193
3,418,789 A 12/1968 Hoffman et al.
(Continued)

FOREIGN PATENT DOCUMENTS

DE  42 40 873 C2   3/2001
DE  20308576 U1   1/2004
(Continued)

OTHER PUBLICATIONS

International Search Report dated Mar. 6, 2019 in corresponding International application No. PCT/FR2018/052710; 10 pages.

*Primary Examiner* — Robert Clemente
(74) *Attorney, Agent, or Firm* — Maier & Maier, PLLC

(57) ABSTRACT

The filtration device enables the separation and collection of dust and particles produced by the pads of a brake assembly. A first separation unit having an air filtration medium, typically annular, is provided in the housing of the device, in order to define an upstream zone where air is admitted, for example tangentially, and a downstream zone in communication with an outlet of the housing for discharging the purified air. The upstream zone is in communication with a lower stage situated lower down, in which a second separation unit is located in order to separate water from particles that have fallen from the upstream zone. A filtration by the (Continued)

second unit is intended to collect clean water and possibly to discharge this water by gravitational flow. The fallen particles remain trapped inside the device, under the first unit.

17 Claims, 5 Drawing Sheets

(51) Int. Cl.
*B01D 46/24* (2006.01)
*B01D 46/42* (2006.01)
*B01D 46/48* (2006.01)

(52) U.S. Cl.
CPC ..... *B01D 46/0034* (2013.01); *B01D 46/0045* (2013.01); *B01D 46/0046* (2013.01); *B01D 46/2414* (2013.01); *B01D 46/4272* (2013.01); *B01D 46/48* (2013.01); *B01D 2279/40* (2013.01)

(58) Field of Classification Search
CPC ............ B01D 46/0046; B01D 46/2411; B01D 46/48; B01D 2279/40; B01D 46/4272
See application file for complete search history.

(56) References Cited

U.S. PATENT DOCUMENTS

| | | | |
|---|---|---|---|
| 3,980,457 A | 9/1976 | Smith | |
| 4,082,107 A * | 4/1978 | Hoffman | F16T 1/20 137/414 |
| 9,970,594 B2 * | 5/2018 | Doki | F16T 1/22 |

FOREIGN PATENT DOCUMENTS

| | | |
|---|---|---|
| DE | 202008009717 U1 | 11/2009 |
| DE | 102009021203 A1 | 1/2010 |
| FR | 3 046 644 A1 | 7/2017 |
| JP | S6183412 U | 6/1986 |
| JP | H07328349 A | 12/1995 |

* cited by examiner

FILTRATION DEVICE AND USE OF SAID DEVICE FOR SEPARATING AND COLLECTING BRAKE DUST

FIELD

The present invention relates to devices for separating pollutants generated during braking, typically by the action of pads against a rotor disc rotating about an axis. The field of application of the invention relates in particular to separating dust and water to render a brake assembly non-polluting when a road vehicle (for example an automobile, truck, motorcycle) or railway vehicle (train, tram, subway) is braking.

BACKGROUND

In a manner that is known per se, there is a need to treat the dust and particles resulting from the abrasion of friction brake systems. The dust and particles may first be captured by suction, as described for example in patents DE 42 40 873 C2 or FR 3 046 644, and the flow is then filtered through a filtering wall/membrane.

It is also known, from patent DE 20 2008 009 717 U1, to capture and retain the dust and particles in the filter medium, which for example has a U-shaped cross-section, said filter medium being mounted as close to the caliper bracket as possible.

However, these systems are not particularly effective in the long run. When the filter medium is too close to the braking zone, temperatures can approach 600° C., which limits the choice of filter medium and reduces the performance of pollutant reductions.

In addition, captured dust and particles often form a heterogeneous mixture, particularly when there is water as well. Liquid saturation of the filter membrane facilitates premature clogging, for example.

U.S. Pat. Nos. 3,418,789 and 3,980,457 show devices for a compressed air circuit, which clog extremely quickly if used to treat this kind of heterogeneous mixture.

There is therefore a need for reliable and robust solutions that offer a good compromise between efficiency/adaptation to the complexity of the types of dust and particles to be separated, throughout the lifetime of the separation device.

SUMMARY

The present invention aims to overcome one or more of the abovementioned disadvantages by proposing a filtration device which is more effective for separating pollutants, in a suitable manner, from a mixture collected in the braking zone.

To this end, the invention relates to a device for filtering brake dust and particles, intended to collect dust and particles produced by one or more pads of a brake assembly, the device comprising:
- a housing having an inlet for the intake of an air flow loaded with brake dust and particles and an outlet for the discharge of purified air, and
- separation means for retaining the dust and particles, with the distinctive characteristic that the separation means comprise:
  - a first separation unit, housed in the housing and enabling the separation of dust and particles, the first separation unit comprising a filtering element provided with a filter medium and defining an upstream zone in communication with said inlet and a downstream zone in communication with the outlet, the upstream zone also being in communication with a stage called the lower stage located lower down than the first separation unit, the air preferably circulating centripetally through the filter medium to reach the downstream zone,
  - a second separation unit enabling the separation of water from the dust and particles that have fallen from the upstream zone, the second separation unit being located in the lower stage and suitable for filtering the water by retaining dust and particles, preferably by centripetal filtration.

It is thus possible to collect the water in a lower stage which is offset (lower) relative to the streamlines of the untreated air flow admitted into the internal volume of the housing. The inlet may be designed and arranged to direct and optionally accelerate the admitted air flow, possibly by being supplemented with guide members and/or baffle walls which are mounted inside the housing. The addition, at the air inlet, of parts or contours that create reductions in the cross-sectional area is advantageous for accelerating the velocity of the fluid, as in cyclonic technology.

Typically, the lower stage corresponds to a lower portion of the housing, for example a lower portion of a bowl of the housing.

The first separation unit may be superimposed on the second separation unit, within the internal volume of the housing.

This type of configuration makes it possible to have three concurrent effects that are advantageously combined in the device:
- circulation, which with air can be fast, which simply needs to reach a downstream zone (typically central) before exiting the housing, which reduces the pressure drop,
- use of gravity to allow the dust and particles circulating/having circulated upstream to fall naturally into the lower stage, typically at the periphery, of the first separation unit,
- water collection offset towards the bottom to limit interference with the circulation of air near the first separation unit, which makes it possible to collect water droplets both during the supply phases of the device and the shutoff phases, if necessary by releasing a closure member if water is also located on the downstream side.

The filtration device can be compact, without the need for intermediate pipes between the separation units. The compact height makes it possible to reduce the constraints on the clearance required in order to remove the cover from the housing (for example by unscrewing) and to extract an arrangement of separation means in the form of a cartridge mounted as a unit within the internal volume of the housing. This therefore facilitates maintenance operations with replacement of the cartridge.

According to one feature, the separation means are interconnected by superposing the first separation unit on the second separation unit, so as to form the filter cartridge which is mounted as a unit within the internal volume of the housing.

According to one option, the cartridge also has a retaining cap capping the second separation unit and comprising:
- at least one first guide element, called the upper guide element, preferably forming a generally annular outer edge of the retaining cap, for guiding radially inward the dust and particles falling from the portion of the upstream zone that surrounds the first separation unit, at least one second guide element (called the lower guide element and positioned lower than the first guide element), preferably forming a downward slope, for guiding radially outward the dust and particles that have been guided by the at least one first guide element.

Preferably, the downstream zone extends under a removable cover comprising the outlet and/or includes the hollow inside space annularly defined by the filter medium of the first separation unit.

The second separation unit defines a partitioning in the lower stage, to allow the accumulation of clean water in a collection compartment separate from the location where the dust and particles (pollutants) accumulate.

According to one feature, a bottom is provided in the housing that allows discharging the clean water and which has a slope facilitating the flow of water droplets from the dirty zone to the clean zone, the collection compartment having a purge port located in a low point of said bottom. Optionally, the bottom is conical or partially conical to form such a downward slope towards a central position corresponding to the collection compartment or an access thereto.

According to one feature, magnetic means are provided in the lower stage for collecting metal dust and particles (loaded with ferrous metal). The magnetic means may comprise one or more arcuate strips, forming a concave inner face facing a filtering wall of the second separation unit. The magnetic means are typically formed by one or more permanent magnets.

More generally, the second separation unit comprises one or more magnetic members which:
  are adapted to attract dust;
  form all or part of a wall internally defining a tank for trapping/collecting dust; and
  optionally are facing an outer face of a filtering material that is permeable to water, preferably felt or other fibrous material.

According to one feature, the filter medium is annular, extending around a longitudinal axis which may correspond to a vertical axis. Pre-separation by a wall of a pre-separator member is typically provided. This wall is generally tubular and arranged in the upstream zone, around the separation unit.

It is understood that the pre-separator member, tubular or partially tubular about the longitudinal axis, may include a piece that is permeable to the air flow loaded with fine particles/impurities and water, which allows a portion of the air flow to circulate between the inlet and the receiving face (typically the outer face) of the filter medium, without bypassing the pre-separator member via the axial end edges of the pre-separator member. For example, the wall of the pre-separator member is rigid and perforated, which renders the pre-separator member permeable in order to admit the flow of air in centripetal directions (distributed around a circumference of the arcuate wall, this wall (radially) surrounding/covering on the outside typically more than one third of the outer face of the filter medium). The air can therefore flow centripetally, directly from an inner face of the wall of the pre-separator member to the outer face of the filter medium.

Preferably, this wall has openings defining narrow passages and forms an obstacle restricting centripetal circulation, in order to maintain adequate distribution between a centripetal flow (subdivided into discontinuous streamlines, according to the distribution of the narrow passages), and a continuous air flow along tangential streamlines, around the separation unit and along a wall of the housing.

The system can be simple and effective for separating liquid particles (water). The streamlines for gas are strongly curved and converge towards the longitudinal axis in a centripetal circulation of the gas flow only after a detour via the passages of the pre-separator, which differs greatly from the path of the heavy dust/particles and water droplets that are displaced outward under the effect of the incoming velocity of the admitted air and the resulting centrifugal force. This minimizes the pressure drops associated with the filtration by the first separation unit.

The filtering element may optionally be in the form of a cartridge that can be extracted from the housing. The annular filter medium may be of pleated paper to form a larger medium surface, so that the filtration efficiency and service life of the medium can be increased.

As an option, the filter medium includes or consists of an annular air filtration unit made of paper, which may be relatively rigid. This medium may extend between two molded flanges (each plastic, typically without metal) forming end caps.

Preferably, the inlet of the housing may be oriented tangentially, in other words opening in a direction away from the downstream zone and tangential/parallel to a side wall of the housing surrounding the upstream zone. When the inlet includes a pipe segment connected to the side wall of the housing, the general guiding direction of this segment may typically be horizontal or inclined downwards or upwards, for example perpendicularly or at an angle between 70 and 90° with respect to a longitudinal axis of the filter medium. An acceleration effect can be obtained when the incline makes it possible to reduce the cross-sectional area of the passage.

According to one feature, the filter medium of the filtering element is permeable to water.

Where appropriate, water can accumulate in an internal collection zone defined by the filtering element (in stage of the device called the upper stage).

Optionally, a water collection compartment is provided in the lower stage, the filtration device having a path for discharging water from the downstream zone to this collection compartment.

According to one feature, the filtration device comprises a collection compartment for the separated water, located in the lower stage. Preferably, the filtration device also comprises water discharge means suitable for causing the water to flow selectively from the downstream zone to this collection compartment and/or to discharge outside the device the separated water collected in this collection compartment. The collection of clean water in a dedicated compartment is thus enabled. In addition, the discharge means are provided in an area placed behind (downstream of) a filter medium, in other words a clean area. This avoids the risk of such discharge means being obstructed by dust or particle solids.

According to one particular feature, the water discharge means are:
  suitable for discharging the water downwards, in other words in the direction of gravity, and
  formed separately from the outlet for discharging purified air.

The water discharge means comprise for example:
  a purge port for emptying the collection compartment, and
  a closure member, called the first closure member, movable between a position that closes the purge port and a position that opens the purge port.

According to one option for its function, such a closure member can be moved automatically to a purge position when there is no longer any rotation of the rotor disc of the brake assembly. This movement can correspond to a return to a default position of the closure member, in the absence of suction by a collection device associated with the brake or in the absence of another type of pressure differential allowing air to flow through the first separation unit. This is the case for example at shutdown of the vehicle or engine equipped with the brake assembly.

A negative pressure, typically on the outlet side, may be used to close a closure member or other moving part of the discharge means. Such a closure member (referred to as the second closure member in the option where a first closure member is provided for purging the collection compartment) for example allows isolating from one another:
  the collection compartment, and
  the downstream zone where the filtered air flows towards the outlet.

The water discharge means may thus comprise a second closure member, able to place in communication the downstream zone and the central internal volume surrounded by a filter medium of the second separation unit, in an open configuration of the second closure member.

Advantageously, the flow of water is simply due to gravity when the water discharge means are in an open state.

Each of the materials for filtration can allow water to pass through. It is understood that the separation means of the device may have a configuration with an outlet placed on the top of the filter medium, opposite from the lower stage, and at least one obstructing and/or baffle wall which guides the water downward. With such a wall and with the low position of the collection compartment, the device allows discharging excess water droplets into a zone that is offset from the main flow of circulating air.

A pre-separator may be interposed between a side wall of the housing and the outer face of the annular filter medium, to limit the passage of water into the filter medium of the first separation unit.

According to one feature, such a pre-separator is advantageously combined with a cyclone effect, in other words a rapid rotation of the admitted flow of air loaded with dust and particles. The heavy particles are far from the longitudinal axis passing through the hollow space of the annular filter medium and can fall into the lower stage without the need for filtration.

In the following, heavy dust or particles should be understood to mean dust or particles of relatively large size and thus falling quickly due to gravity. The use of tangential acceleration around a substantially vertical axis makes it possible to exert a centrifugal force which contributes to increasing, by agglomeration, the size of the dust pushed outwards, and to facilitating the falling of this dust due to gravity, even during operation of the filter.

The pre-separator may be in the form of a piece or insert forming a deflector for deflecting large dust particles. Among non-limiting examples of a design for this pre-separator, one can mention:
  the presence of vanes extending to substantially the same height as the height of the filter medium of the first separation unit (or of course to a greater height), with a solid/air-impermeable portion, for example in the form of a smooth outer surface portion facing the air inlet,
  the presence of a plurality of vanes distributed among at least two heights,
  the presence of vanes extending for only a portion of the height of the piece or insert, the upper portion able to be solid and typically smooth,
  the presence of at least one spiral rib projecting radially outwardly to guide the dust and particles into the bottom of the housing,
  the presence of perforations in a cylindrical body, for example perforations that are circular, rectangular, oblong, or any other shape restricting the dimensions of the perforation (for example less than 4 or 5 mm for the largest dimension of the opening).

Optionally, the vanes have a different orientation than a tangential orientation but with a change of orientation that is less than 90° so that each outer edge of a vane is offset backwards (in the direction of the tangential circulation) relative to the inner edge of the same vane. With this arrangement of vanes, access from the outside to the passages between two adjacent vanes is oriented in the opposite direction to the direction of the tangential circulation of the air flow entering the housing. The vanes define narrow slots for passage between each other, by means of which the streamlines passing through the pre-separator (between adjacent vanes) are bent to form a pronounced angle, the angle at the bend or equivalent angle being for example between 30 and 90°, preferably between 45 and 85°.

The lower stage can form a dust trap and is for example defined by a part forming a cap, typically having a frusto-conical or convex portion, widening radially outwards with axial distancing relative to the first separation unit. The frustoconical portion has one or more openings and extends around a central pipe segment that can serve as a fluid connection that is fluidtight (relative to the upstream zone), between the downstream zone and the collection compartment.

More generally, it is understood that the device makes it possible to discharge an overflow of water droplets downwards and that the lower stage can form both a dust tank, for example for dust trapped by magnetic means, and a collection compartment for water that can be purged.

A dust barrier element may be provided in the lower stage, for example to form a separation between the dust tank and the water collection compartment.

The barrier element may be annular in shape and internally defines a central internal volume of the lower stage.

According to one option, the second water separation unit forms a lower end of the filtration device and comprises the collection compartment, the dust collection tank formed in the lower stage being separated from the collection compartment by a dust barrier element which preferably has a tubular shape. An additional filtering element can supplement the tubular barrier element, for example by being placed at the bottom of the collection compartment where a discharge passage for purging is formed. Such an additional filtering element, optionally based on felt, provides safety: it ensures that it is indeed clean water that is released into the environment.

The closure member of the purge valve is typically movable in order to be able to be in a closed position, particularly when there is negative pressure in the lower stage. Such a closed position prevents interference with the flow towards the outlet, especially in operating conditions without water in the collection compartment.

In various embodiments of the filtration device according to the invention, one or more of the following arrangements may be provided:
  the filter medium extends between two molded flanges forming end caps,
  the flanges are typically distinct from the pre-separator member, a flange called the lower flange of the filtering element being able to bear/rest directly (axially) on the upper face of a transverse base of the pre-separator member.

the inlet opens internally into a region of the upstream zone located or defined (preferably entirely located) axially between the upper flange and the lower flange.

the collection compartment comprises the central internal volume defined by the barrier element of the second separation unit and possibly an underlying volume, in communication with the central internal volume via a passageway formed in a bottom wall of the housing or in an annular support of the barrier element sealingly connected to a lower edge of the barrier element.

the filter medium in the first separation unit is suitable for retaining retain light dust, in particular loaded with little or no metal, the first separation unit comprises a pre-separator member, located in the upstream zone and surrounding the filter medium, forming a perforated or openworked annular deflector in order to be permeable to light dust, the outer face of the annular deflector being suitable for guiding towards the lower stage the heavy materials that are less volatile than light dust, in particular heavy dust loaded with metal and liquid droplets.

the inlet has a tangential outlet into the internal volume of the housing and the pre-separator member is preferably without any through-openings in a portion adjacent to the inlet.

the outer face of the annular deflector is suitable (for example with elongated reliefs along a circumferential direction) for guiding in a tangential direction, and forms bending edges for streamlines transferring air from the upstream zone to the downstream zone.

the second separation unit comprises or is surrounded by one or more magnetic members.

the one or more magnetic members are suitable for attracting dust and particles in order to retain them below the inlet and, preferably, below the first separation unit.

the one or more magnetic members form all or part of a wall internally defining a dust collection tank.

the one or more magnetic members are facing an outer face of a filter material, preferably felt, that is water-permeable.

the first separation unit comprises an air-filtering filter medium comprising paper.

the second separation unit has a water-permeable fibrous filter material, the paper for air filtration preferably being more rigid than the fibrous material.

in one option, the first separation unit and the second separation unit share a common filtering element, which extends for example around the water collection compartment and around the downstream zone.

the second closure member is mounted in a lower central opening of the first separation unit.

the separation means comprise a retaining cap capping the second separation unit and forming an interface between an annular portion of the upstream zone surrounding the first separation unit and the lower stage.

the retaining cap has an outer annular edge that is distal to a central axis of the filter medium, the outer annular edge preferably being close to or in engagement with an external side wall of the housing, and a central portion defining an axial opening suitable for attachment to at least one among the first separation unit and the second separation unit.

one or more openings are provided between the central portion and the outer annular edge, the retaining cap having an upper face inclined downwardly towards the one or more openings extending from the central portion.

the retaining cap has a radial portion, preferably frustoconical, forming the inclined upper face and which extends between the outer annular edge and the central portion.

a tank for trapping brake dust and particles is defined (in the lower stage) between the radial portion of the retaining cap and a bottom wall of the housing, this bottom wall preferably being inclined towards a central low point of the lower stage.

the one or more magnetic members are adjacent to a bottom wall of the housing and/or contiguous to a side wall of the housing defining an internal volume of the housing in which the separation means are entirely housed.

Also proposed is a brake assembly which is non-polluting in that it essentially eliminates the emission of particles or dust into the atmosphere.

More particularly, the brake assembly, advantageously non-polluting, comprises:
the filtration device,
a caliper bracket,
a rotor disk rotating about an axis,
at least two movable pads intended to press on the rotor disc in order to brake it with a clamping force provided by a bracket, the pads comprising friction material capable of releasing particles resulting from abrasion,
a collector device at least partly arranged close to the caliper bracket, the collector device comprising:
at least one inlet, and
a connecting element, connected to an outlet of the collector device and in communication with the inlet of the filtration device.

According to one feature, the collector device has suction means at least partly arranged close to the caliper bracket, so that each inlet of the collector device is defined by a suction zone formed in the vicinity of each pad and delimited by a deflector.

Also proposed according to the invention is a use of the filtration device in a vehicle or rolling stock, wherein the inlet formed by the housing defines a hollow tube on which is fixed a connecting element, preferably a hose, for connection to a brake dust collector device, the housing of the filtration device being attached by attachment means to a leg of a suspension shock absorber.

Also proposed according to the invention is a use of the filtration device in a vehicle or rolling stock, wherein the lower stage of the filtration device serves to keep brake dust and particles around the second separation unit and under a retaining cap inserted into the housing (preferably inserted under the first separation unit).

Also proposed according to the invention is a use of the filtration device in a vehicle or rolling stock generating brake dust and particles, wherein one or more magnetic members are provided in the lower stage in order to attract and retain brake dust and particles in the lower stage.

Magnetic attraction reduces the risk that dust, particularly heavy dust loaded with metal, will rise (for example in case of jolts) to same height as the first separation unit.

BRIEF DESCRIPTION OF DRAWINGS

Other features and advantages of the invention will become apparent from the following description of several embodiments, given by way of non-limiting examples, with reference to the accompanying drawings in which.

DETAILED DESCRIPTION

In the various figures, identical references indicate identical or similar elements.

Figure 1:
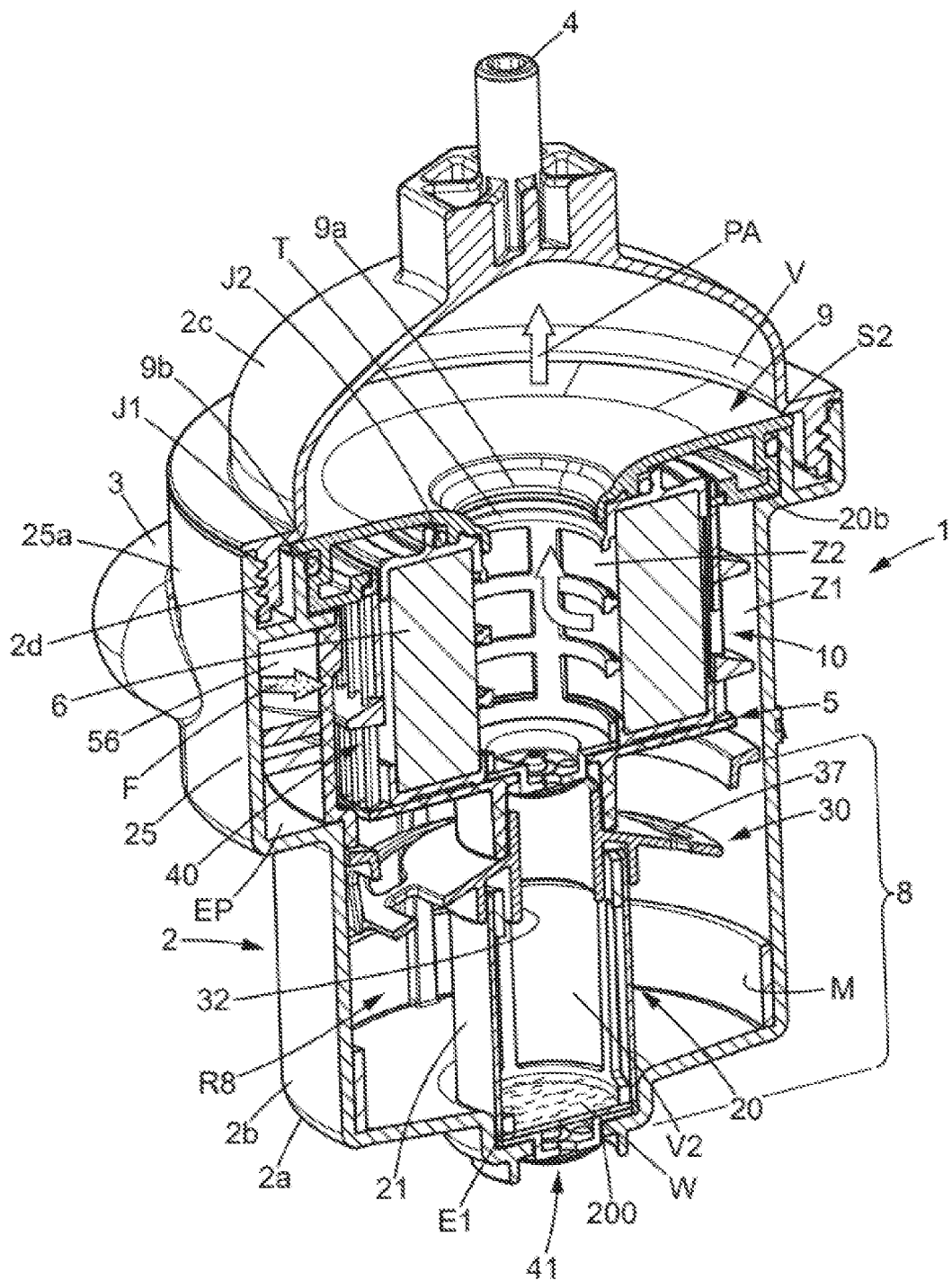
FIG. 1 is a longitudinal sectional view of a filtration device according to one embodiment of the invention.
Figure 7:
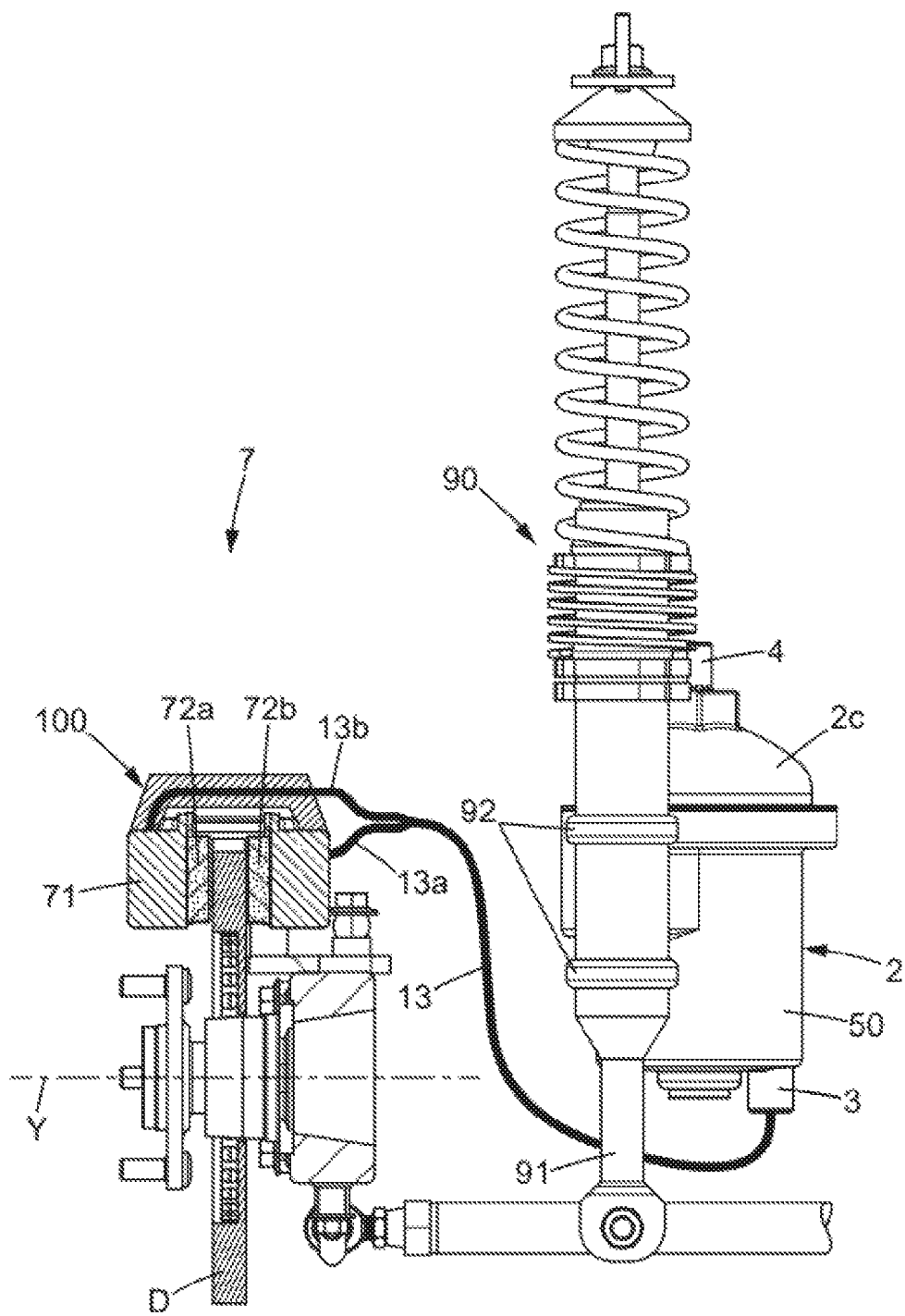
FIG. 7 illustrates an example usage of the filtration device of FIG. 1, in a brake assembly having a brake dust suctioning function.

With reference to FIGS. 1 and 7, the filtration device 1 is provided in order to separate and collect dust and particles produced by pads 72a, 72b of a brake assembly 7. The device or filter 1 comprises a housing 2 which has an upper wall and a lower wall.

As is clearly visible in FIG. 7, the housing 2 is interchangeably connectable to one or possibly multiple channels of a circuit supplying air loaded with brake dust. This circuit is connected to a collector device 100 that is part of a brake assembly 7. Here, the collector device 100 has suction means at least partly arranged near the caliper bracket 71 associated with the rotor disk D, so that each inlet of the collector device 100 is defined by a suction zone formed in the vicinity of each pad 72a, 72b which is engaged against the rotor disk D. The inlet of the collector device 100 may be defined by a deflector, for example as described in document FR 3,046,644.

An inlet 3 formed by the housing 2 may define a hollow tube C3 on which is fixed a connecting element 13, here a hose, for the connection to the collector device 100. The hose optionally splits into two branches 13a, 13b to allow collecting dust from the friction zones respectively associated with the two pads 72a, 72b.

The housing 2 may be made integral to a component installed in the lower part of the vehicle or rolling stock equipped with the brake assembly 7. In the illustrated example, the housing 2 is attached, by means of attachment means 92 (optionally with screwing/bolting), to a leg 91 of a suspension shock absorber 90.

As illustrated in the longitudinal sectional view of FIG. 1, the housing 2 comprises an external side wall 2b which extends from the bottom wall 2a to the upper wall of the housing 2. The bottom wall 2a forms a lower end E1 with an opening 200 which allows purging water by gravity.

The housing 2 of the filter 1 may have a substantially tubular shape about a central axis. In the non-limiting example of the figures, the bottom wall 2a of the housing 2 is defined by or is part of a bowl 50, typically of metal or plastic. This bowl 50 may optionally form a stationary portion in the example shown.

The remainder of the housing 2 is removably fixed with respect to this bowl 50 in order to seal closed the opening 50b of the bowl 50. The upper wall is formed here by a cover 2c, which is sealingly connected to the bowl 50, here by screwing. A male thread may be provided on the cover 2c to engage with the female thread 2d formed in an upper end of the side wall 2b. An upper opening is formed in the cover 2c by a hollow tube. More generally, one can see that the housing 2 has an outlet 4 which may be located on the end opposite from the bottom wall 2a. The example illustrated in FIG. 1 with a central hollow tube to form this outlet 4 is only provided as a non-limiting example.

In some embodiments, the cover 2c may have a flattened shape rather than a dome shape. Moreover, the outlet 4 may correspond to an opening which can directly form an interior passage of a turbine. For example, the bowl 50 or similar housing component may be closed by an electric turbine.

The housing 2 may form or be connected to a water separation stage, preferably in the form of a lower stage 8. The water separation stage may be offset downward relative to an interior zone of the housing located at the same level as the inlet 3. An air filtration stage may be defined in this interior zone which is typically at least in the upper portion of the housing 2, at a distance from the bottom wall 2a.

Figure 4:
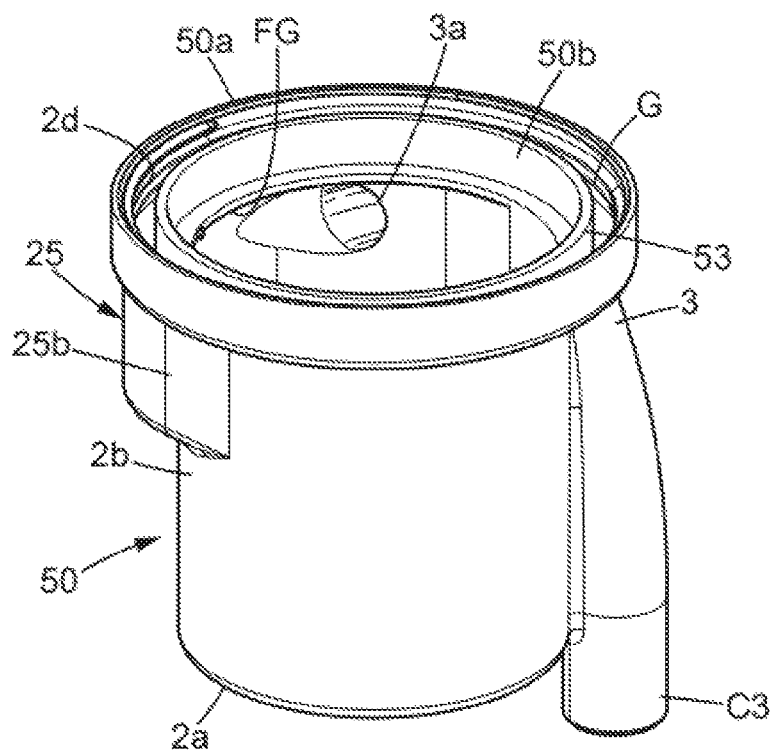
FIG. 4 is a perspective view of a bowl forming a housing component of the filter of FIG. 1.

With reference to FIGS. 1 and 4, the cover 2c may provide the outlet 4, while the inlet 3 is formed on the bowl 50 or on a side wall 2b of the housing 2. FIG. 4 shows the case of a bowl 50 made of one piece which includes the bottom wall 2a, from which the annular side wall 2b extends upward.

The bowl 50 defines a dust tank R8 and further provides a collection compartment CC where water W can accumulate, provided that the opening 200 is closed off. This collection compartment CC and the tank R8 are present in the lower stage 8 (water separation stage). The height of the bowl 50 is for example greater than 50 or 60 mm and preferably exceeds the height of the cover 2c. The water separation stage may have a height that is at least equal to 25 or 30 mm, and typically integrated in the bowl 50.

Figure 2:
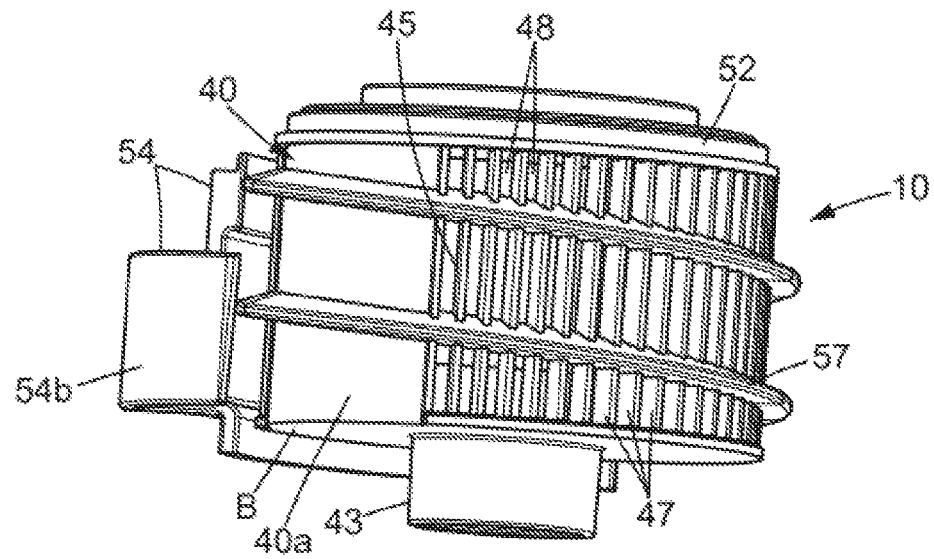
FIG. 2 shows the first separation unit of a filter according to the invention, here with a guide piece to guide the air flow admitted into the filter and a pre-separator member having a solid portion provided facing the guide piece.
Figure 3:
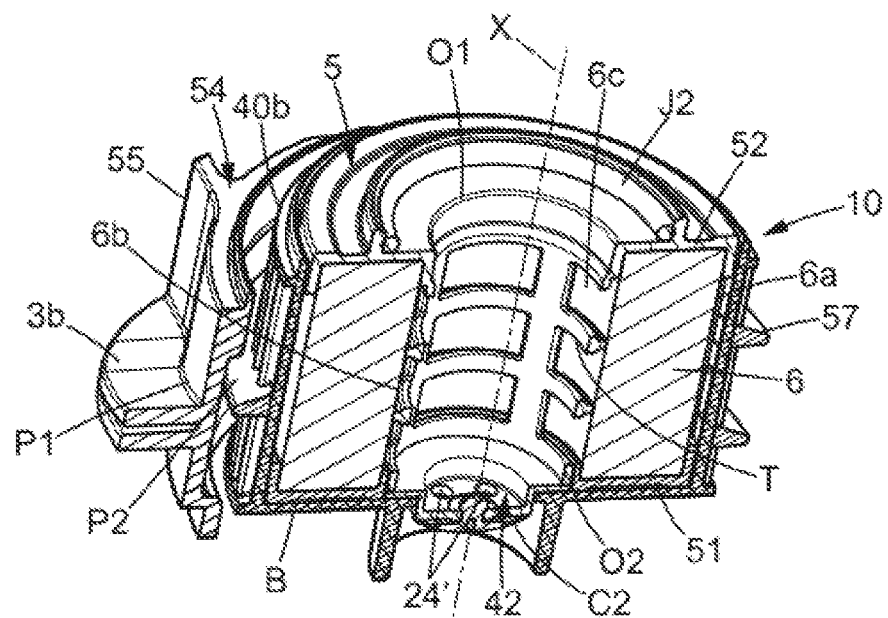
FIG. 3 illustrates a perspective section view of the first separation unit of FIG. 2.

In this example, the bowl 50 also defines all or part of a chamber for housing the filtering element 5 of a first separation unit 10, visible in FIGS. 1, 2, and 3. The chamber for the filtering element 5 is axially distant from the bottom wall 2a.

The upper end 50a of the bowl 50 is annular. Such a bowl 50 can be gripped with one hand, the outer diameter or equivalent dimension of the side wall 2b typically being less than 15 cm. Optionally, the cover 2c may extend substantially over the filtering element 5.

In this case, the side wall 2b of the housing 2 is formed only by the bowl 50. According to another option, it is also possible to provide an intermediate housing component (not shown) which extends around the central axis between open axial ends, respectively upper and lower, this housing component having a generally cylindrical side wall or other suitable shape which defines all or part of the chamber for housing the filtering element 5. In this case, the cover 2c is attached to the upper end of the intermediate housing component, while the bowl or tank/similar bottom is attached to the lower end of the intermediate component. The intermediate housing component then forms a connection adapter between the bowl and the cover 2c.

It is preferred to use a cover 2c which is fixed in a removable manner, in order to be able to replace at least the filtering element 5.

Furthermore, it is intended to place a partitioning element 9 in the housing 2, here able to engage against the top of the side wall 2b to form a seal, typically by means of an annular seal J1. A groove G, visible in FIG. 4, may be formed in the upper end 50*a*. The zone for screwing by use of the female thread 2*d* can then extend into this groove G, while the seal J1 comes to press radially against an annular projection 53 defining the inner side of the groove G.

The partitioning element 9 has a typically flat and annular shape, with a through-opening 9*a*. The through-opening 9*a*, here central/centered on the axis of the housing 2 and the longitudinal axis X of the filter medium 6 of the filtering element 5, allows communication between the outlet 4 and a hollow inside space 6*c* of the filtering element 5. The partitioning element 9 is held in position axially between two opposite abutment zones 9*b*, 20*b* each forming a support that is typically annular. A first axial abutment zone 9*b*, of annular shape, is formed by contact against the cover 2*c*, here against a radial section S2 close to the threaded portion of the cover 2C. This radial section S2 is axially facing an internal rim of the side wall 2*b* which forms the axial abutment zone 20*b* for supporting the partitioning element 9 from below.

The filtering element 5 (forming a filter insert) has, as can be seen in FIGS. 1 and 3, a filter medium 6, a first flange hereinafter referred to as a lower flange 51, a second flange hereinafter referred to as an upper flange 52, and an internal longitudinal component T extending between the lower flange 51 and the upper flange 52. The longitudinal component T, here in the form of a perforated tube, can stiffen the filtering element 5. The filter medium 6 preferably extends about its longitudinal axis X which can correspond to a central axis for the filtration device 1.

The filter medium 6, for example of paper or similar material, is suitable for air filtration. This filter medium 6 may be folded into a star shape to increase the surface area of its outer face 6*a* and facilitate filtration of fine particles.

In the housing 2, the filtering element 5 forms an insert received in the cavity of an annular wall of a pre-separator member 40, said annular wall forming a deflector element 45. The pre-separator member 40 is preferably rigid and forms a lateral sleeve-style casing around the outer face 6*a* of the filter medium 6. The pre-separator member 40 and the filtering element 5 form a first separation unit 10 housed in the housing 2. This first separation unit 10 is mounted immediately below the partitioning element 9 in the non-limiting example of FIG. 1.

The filter medium 6, which is annular, has an outer face 6*a* kept at a distance from the annular wall 45 and an inner face 6*b* in contact with the elongate structural element T, for example only at external ribs of this element T.

Two opposite openings O1, O2 are respectively provided in the upper flange 52 and in the lower flange 51. The hollow inside space 6*c*, defined by the internal face 6*b*, forms a downstream zone Z2 relative to the filtration enabled in a centripetal direction. An annular inner edge of the partitioning element 9 is located near the upper exit of the hollow inside space 6*c*, so that opening O1 and opening 9*a* are axially aligned and more or less coincident to allow the air filtered by the filtering element 5 to flow upwardly and to be discharged from the device 1 via the outlet 4 located higher than the partitioning element 9. The cross-sectional area of the outlet 4 may be much smaller than the cross-sectional area of opening O1.

A superposition of the partitioning element 9 and the upper flange 52, with the use of an intermediate annular seal J2 and the use of seal J1, makes it possible to separate in a sealed manner the downstream zone Z2 from the portion of the upstream zone Z1 formed at the periphery of the filter medium 6 (towards the outer face 6*a*). These seals J1 and J2 may be compressed radially and/or axially. Of course, other configurations may be used, for example to reduce the number of seals or possibly to integrate a sealing member into the upper flange 52 against the side wall 2*b* and an engagement means in abutment under the cover 2*c*.

The use of a partitioning element 9 distinct from the upper flange 52 may be advantageous for mounting and maintaining one or more guide members and/or baffle walls, mounted internally in the housing 2 at the periphery of the first separation unit 10. More generally, there may be added, at an exit 3*a* tangential to the inlet 3 for air loaded with dust F, guide pieces 54 or reliefs that create reductions in the cross-sectional area. This makes it possible to accelerate the fluid velocity and to form streamlines tangential to the external side wall 2*b*, as in cyclonic technology.

In addition, the tangential exit 3*a* is only illustrated as an option, here to form a suitable exit in the side wall 2*b*. In some variants a substantially radial exit or a different exit may be provided, associated with a deflector to deflect the flow of air against one or more outer walls against which the heaviest solid particles and water droplets can fall more or less gradually. For example, the exit may be opposite a baffle suitable for deflecting the flow at approximately 90°, to allow tangential circulation along an outer wall facing the first separation unit 10.

In the non-limiting case of FIGS. 1 to 3, we can see an arrangement with one or more guide pieces 54 placed in a protrusion 25 (protruding outwardly) from the side wall 2*b*.

The protrusion 25, visible in FIG. 4, is formed in an upper portion of the side wall 2*b*, for example in an angular sector of about 90°, 120°, or 180° relative to the axis of the device 1 (in other words a quarter, a third, or half of the circumference of the upper portion of the side wall 2*b*). The lower portion of the side wall 2*b* may be more regular, for example with a circular circumference. The internal exit 3*a* of the inlet 3 is formed at a first end 25*a* of this protrusion 25, here under an annular wall FG forming the bottom of the groove G. The protrusion 25 makes it possible to form an outwardly offset guide channel 56, with a smaller curvature than a passage which extends flush with the pre-separator member 40.

A guide piece 54 may have an external rib 55 parallel to the longitudinal axis X of the filter medium 6. This rib 55 forms an obstacle in the annular space around the first separation unit, which prevents particles/dust having already made one trip around the upstream zone Z1 from continuing to travel around the first separation unit 10. Thus, such particles/dust encountering this rib 55 cannot mix with the flow entering by the inlet exit 3*a*.

With reference to the non-limiting example of FIG. 3, the guide piece or pieces 54 may define two passages: an external passage P1 corresponding to a guide channel 56 for air coming out of the inlet exit 3*a*, located radially outward of the guide pieces 54, and an inner passage P2 flush with the outer face of the pre-separator member 40, on the inner side and parallel to the outer passage P1. The inner passage P2 serves for the tangential circulation of particles that have already made at least one trip around the pre-separator member 40 of the first separation unit 10.

An external radial relief and/or an additional piece, here forming a slightly upward slope 3*b*, allow accelerating the speed of circulation in the channel 56. Under this slope 3*b*, an obstructing wall acting as an obstacle similar to the role of the rib 55 may be provided, in order to cause particles to drop lower down. A guide extension 54*b* may be formed under a narrower end zone of the guide channel 56. This guide extension has for example an inverted L cross-section when the slice is longitudinal and through the central axis of the device 1. The top of this guide extension 54b forms the free end of the slope 3b.

The second end 25b is at the same height as the first end 25a, under the annular wall FG (here the wall forming the bottom of the groove G). It is understood that the air flow is channeled between three elements: the annular wall FG, the inner face of the side wall 2b, and the shoulder EP defining the bottom of the protrusion. The one or more guide pieces 54 may be arranged in abutment against the shoulder EP and in engagement with the internal edge of the annular wall FG in order to delimit/define, with the three abovementioned elements, the guide channel 56, clearly visible in FIG. 1. With this guidance in the guide channel 56, tangential streamlines are generated around the pre-separator member 40 which forms the outer face of the first separation unit 10.

The tangential admission of air F and the acceleration caused by the reductions in cross-sectional area in the peripheral zone in the first separation unit 10, contribute to pushing the dust and particles towards the outside by centrifugal force, against the side wall 2b of the housing 2. This effect enables the particles located the most peripherally to the tangential flow in the upstream zone Z1 to drop, these particles in practice being the heavier particles.

The pre-separator member 40 may optionally include one or more spiraling ribs 57 which progressively descend, thus encouraging the descent of the dust and particles to below the height of the protrusion 25. More generally, this type of descending guidance (in a progressive descent, which typically requires one trip around the filter medium 6) by the outer face of the first separation unit 10, can be an advantageous option when the air to be filtered admitted into the housing 2 is first channeled in a tangential flow channel before being centripetally filtered.

In general, a pre-separator member 40 may be provided having outwardly protruding reliefs (for example the ribs 57) which oppose a direct vertical downward movement of the air flow along the outer face of the pre-separator member 40, thereby increasing the path/travel length of streamlines along the perforated regions of the annular wall forming the deflector 45.

The pre-separator member 40 may have a wall portion 40a which is solid near the second end 25b, where the guide channel 56 ends. The longitudinal extension 54b, when present, is facing this wall portion 40a.

In this embodiment option, the creation of streamlines with a centripetal component is not allowed before a tangential path threshold length is exceeded. Such a threshold length enables significant acceleration of the flow of air circling around the pre-separator member 40.

Referring to FIG. 2, the pre-separator member 40 may have many access passages 48 in the outer face 6a of the filter medium 6, here outside the wall portion 40a. The access passages 48 are narrow in the direction of flow and may optionally be elongate in the vertical direction or a similar direction parallel to the longitudinal axis X of the filter medium 6.

The pre-separator member 40 defines a receiving space where the filtering element 5 can be housed coaxially with a lower tube 43 integrally formed with an annular base B of the pre-separator member 40. Here, a single rigid piece forms the pre-separator member 40, but a design with multiple assembled parts may be provided. A deflector element 45, formed by the annular side wall of this pre-separator member 40, extends upwardly from the base B.

As can be seen in FIGS. 1 and 3, the lower flange 51 of the filtering element 5 can rest directly on the upper face of the base B. In order to minimize the radial spacing between the outer face 6a and the side wall 2b of the housing 2, the lower and upper flanges 51, 52 may be in radial contact against the inner face of the deflector element 45. Here these flanges 51, 52 cover the axially opposite faces of the filter medium 6 in an adjusted manner. The annular deflector 45 is openworked or perforated to form the access passages 48, so as to be permeable to light dust.

The outer face of the annular deflector 45 may be adapted to guide, towards a lower stage 8, heavy materials that are less volatile than light dust. Here, the spiral ribs 57, preferably continuous and formed integrally with the side wall of the pre-separator member 40, enable such downward, advantageously progressive, guidance.

Heavy materials include, in particular, heavy dust loaded with metal and liquid droplets. The acceleration in the guide channel 56 or in a similar entry zone of the air flow F makes it possible to project and maintain these materials (by centrifugal force) against the outer wall defining the upstream zone Z1, in other words the internal face of the side wall 2c in the example illustrated in FIG. 1.

The filter medium 6 is suitable for retaining light dust, in particular loaded with little or no metal, such dust being less susceptible to the centrifugal effect. With reference to FIG. 2, such light dust can pass between two radial vanes 47 each having a similarly modified orientation relative to the radial direction.

These vanes 47 may be flat but oriented at an angle of 5 to 45°, preferably 10 to 40°, relative to a radial direction passing through the axis longitudinal X. This angular offset is positive, in the direction of the peripheral circulation around the first separation unit 10, so that the deflection necessary to change from a tangential direction to a direction of entry into the unit 10, between two successive vanes 47, is not 90° but an angle greater than 90° (between 95 and 135°, preferably between 100 and 130°).

The presence of vanes 47 extending to substantially the same height as the height of the filter medium 6, with a portion 40a that is solid/air-impermeable, is a non-limiting example of the design of the pre-separator member 40. It is also possible to provide a plurality of vanes 47 distributed among at least two heights, or extending over only the lower portion of the height (at the base B but without any side passage near the upper edge 40b). In this variant (not shown), the annular upper portion of the deflector element 45 may be solid (typically smooth). In other words, the portion 40a forming a solid vertically extending band is replaced by a solid annular band.

Alternatively, other ways of defining narrow access passages 48 may be provided, for example by perforations distributed annularly over all or part of the circumference of the deflector element 45.

Moreover, it is possible to eliminate the spiral rib or ribs 57. Optionally, similar reliefs may be formed/added on the internal face of the side wall 2c of the cover 2.

Figure 5:
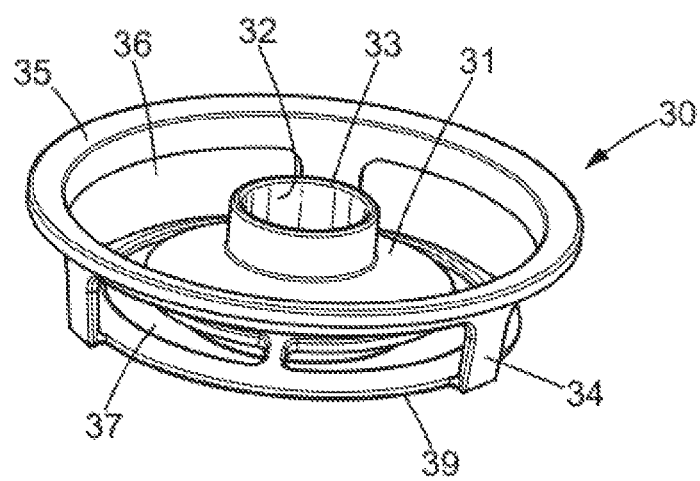
FIG. 5 shows a piece forming a retaining cap, suitable for defining a lower stage in the housing where dust is trapped.
Figure 6:
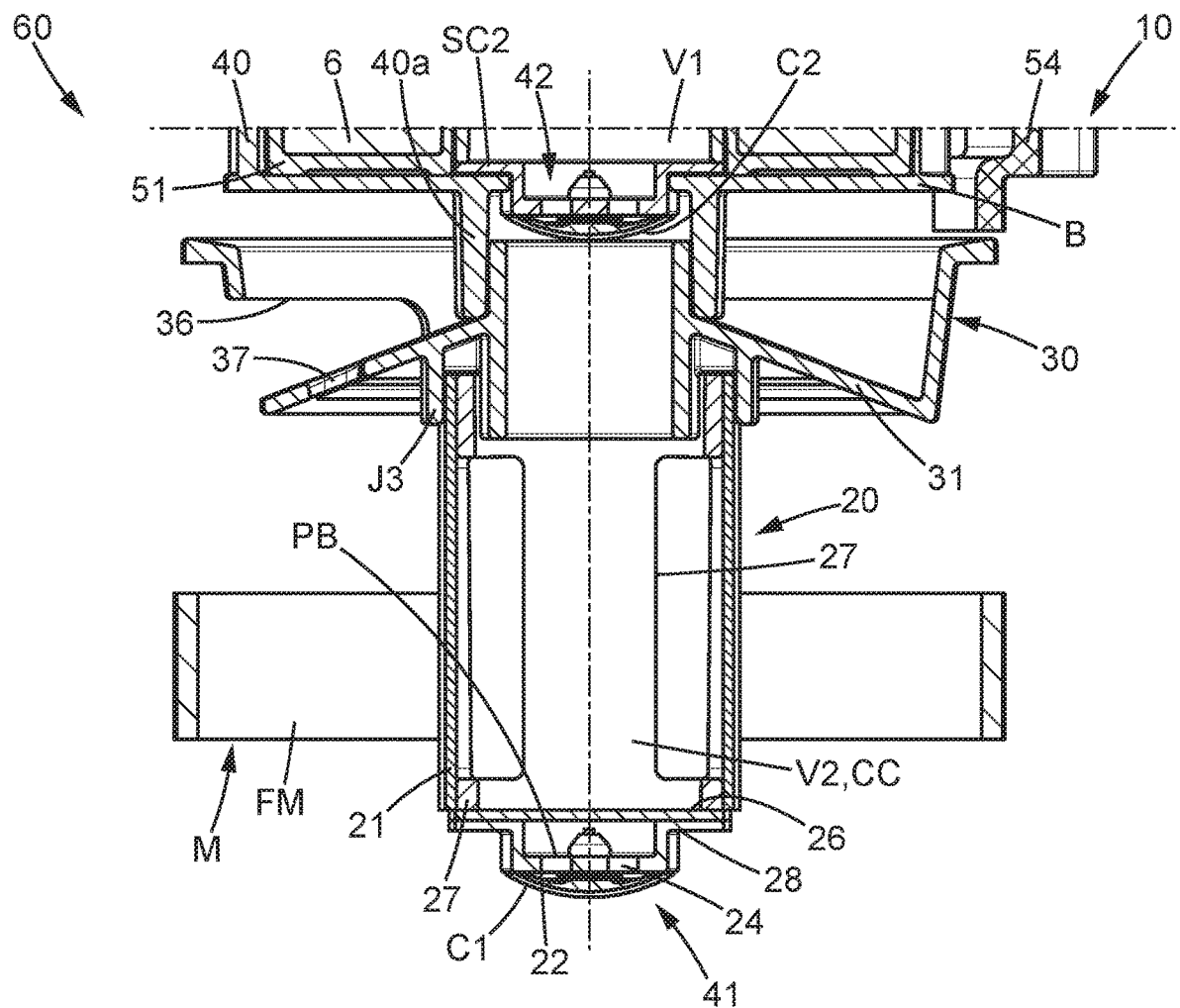
FIG. 6 is a vertical sectional view illustrating in particular the second separation unit and its integration under the first separation unit, in a coaxial position relative to a peripheral annular arrangement of magnetic members.

Referring now to FIGS. 1, 5, and 6, the integration of the second separation unit 20 and the treatment of the particles and water droplets which fall into the lower stage 8, below the first separation unit 10, are now described.

The upstream zone Z1, typically annular and formed along the side wall 2c, is subdivided into a first portion or sub-zone surrounding the filter medium 6 of the first separation unit 10 and a second portion or sub-zone which is lower, located in the lower stage 8. While the first sub-zone forms a spiral circulation circuit for the heavier dust and particles, optionally with some zones where they fall faster (for example along the rib 55), the second sub-zone may be at least partially sheltered from the circling streamlines, in the tank R8 formed under a retaining cap 30.

With reference to FIGS. 1 and 6, the retaining cap 30 may be an intermediate piece placed between the lower tube 43 forming the lower end of the first separation unit 10 and the top of a second separation unit 20. More generally, a retaining portion or piece is provided under the base B, which limits the vertical ascent (in case of jolting) of dust that has fallen into the lower stage 8 located towards the bottom wall 2a of the housing 2.

The second separation unit 20 comprises a collection compartment CC where water W can either accumulate or be purged. This collection compartment CC may be at least partly internal to the housing 2 or is sealingly connected to the internal volume V via a pipe leading towards the bottom wall 2a.

In the illustrated example, it is the lower stage 8, internal to the housing 2, which forms the tank R8 for trapping the fallen dust and particles. This tank R8 preferably extends annularly around the second separation unit 20. A dust barrier element 21 that is part of the second separation unit 20 separates the tank R8 from the collection compartment CC.

When water is present in the admitted flow of air F, the dirty droplets collected in the tank R8 fall against the bottom wall 2a or other wall defining a bottom of the tank R8. As is clearly visible in FIG. 1, the bottom of the tank R8 may form a slope. Optionally the bottom is conical/frustoconical or partially conical to form such a downward slope towards a central position corresponding to the collection compartment CC or an access thereto. Here, the slope is shaped like a funnel but preferably with a gentle slope. The incline may continue from the side internal to the barrier element 21, and/or a central low point PB of the lower stage 8 is formed which may be located below the level of a lower end of the barrier element 21.

In other words, in the lower stage 8, the filtration may be carried out passively, gravity alone causing the water droplets to travel from the peripheral tank R8 to the collection compartment CC. The slope facilitates the flow of water droplets from the dirty zone to the clean zone. Typically, the collection compartment CC has a purge port 22 located in a low point of this bottom. The purge port 22 may optionally have a plurality of openings 24 in a lower cap 28 of the second separation unit 20.

There is also a first closure member C1, movable between a position that closes the purge port 22 and a position that opens the purge port 22. This first closure member C1 may optionally be closed when the weight of the filtered water W remains below a threshold. The first closure member C1 may optionally be controlled by a control unit.

It is understood that the use of valves 41, 42 with a respective flexible closure member C1, C2 is a solution that is simple in design. Although the figures show two passive closure members C1, C2, electromagnet controls of active valves of another type can be used. More generally, any type of discharge means 41, 42 can be provided for discharging the water and preventing it from remaining trapped in the housing 2.

The barrier element 21 may comprise or consist of a tubular filtration medium, mounted on a stiffening structure 27. The barrier element 21 here is permeable to water and surrounds or internally defines a central internal volume V2 of the lower stage 8. This central internal volume V2 may form all or part of the collection compartment CC for clean/filtered water W.

The central internal volume V2 may optionally be in communication with the hollow inside space 6c via the opening O2 in the lower flange 51 and a passage through the base B which may be defined by the lower tube 43. This type of passage can enable water droplets collected in the downstream zone Z2 to fall, these droplets for example able to form by coalescence while passing through the filter medium 6 of the first separation unit 10. The passage is preferably obstructed as long as air is actively filtered (via a pressure difference) into the first separation unit. The closure member C2 of the valve 42 for example enables this obstruction, here by closing openings 24' formed in a bottom member located under the hollow inside space 6c.

More generally, it is understood that the filtration device 1 may have a water discharge system suitable for causing the water W to circulate selectively from the downstream zone Z2 to the collection compartment CC and/or to discharge the separated water W accumulated in the collection compartment CC to outside the device 1.

An additional filtering element 26 may supplement the tubular barrier element 21, for example by being placed at the bottom of the collection compartment CC. Such an additional filtering element 26 makes it possible to release very clean water. Felt may be used for filtration of the water W, in the barrier element 21 and/or in the additional filtration element.

A configuration with one or more closure members C1, C2 allows discharging the water W downwards in the direction of gravity, without any source of energy. The one or more closure members C1, C2 for the flow of water are formed separately from the outlet 4 for the discharge of purified air, preferably in respective lower ends of the first separation unit 10 and second separation unit 20. These ends are formed by the valves 41, 42.

In the non-limiting example of FIG. 6, a second closure member C2, placed above the first closure member C1, is kept closed when there is negative pressure in the housing in the downstream zone Z2. When the circuit supplying the device 1 is shut off, this second closure member C2 deforms elastically towards its default shape/configuration to close off the through-passage. The seat of the second closure member C2 may be formed by a piece SC2 separate from the lower flange 51 which is mounted internally against an upper face of the lower flange 51. The longitudinal component T may extend between the two flanges 51, 52 by abutting axially against a collar of this piece SC2. The openings 24' are formed in this piece SC2, for example around a central passage through which an axial member for anchoring the closure member C2 is mounted.

As for the dust and particles, these are retained on the outer side by the barrier element 21. In addition, to reduce or eliminate the risk of clogging the barrier element 21, it is possible to move the dust radially outward by the use of magnetic members M such as magnets. The barrier element 21 of the second separation unit 20 may thus be surrounded by one or more magnetic members M which are suitable for attracting dust and particles. The internal face FM of the magnetic members M, which are concave, may extend for example at a distance (possibly constant) that is more than at least 15 or 20 mm from the outer face of the barrier element 21.

Permanent magnets, for example arranged in the form of an outer ring, improve retention under the retaining cap 30, at a height that is below the inlet 3, and preferably below the first separation unit 10.

With reference to FIGS. 1 and 5, the magnetic members M are placed at the bottom of the interior volume V of the housing 2, at an axial distance from the retaining cap 3. The retaining cap 30 here covers the second separation unit 20 and forms an interface between the lower stage 8 and the annular portion (first sub-zone) of the upstream zone Z1 surrounding the first separation unit 10.

This retaining cap 30 may be contiguous to or adjacent to the side wall 2b, at an outer annular edge 35 distal to the central axis X of the filter medium 6. The retaining cap 30 may have an annular portion forming a upper guide element for guiding radially inward the dust and particles falling from the portion of the upstream zone Z1 surrounding the first separation unit 10. The outer annular edge 35 may be close to or in engagement with the outer side wall 2b.

The retaining cap 30 also forms a lower guide element (located lower than the first guide element), having a downward slope profile, for guiding radially outward the dust and particles that have been guided by the upper guide element, traveling through an opening or a first series of side openings 36 close to the side wall 2b.

The retaining cap 30 is for example held in position, above the second separation unit 20, by a central portion 32 defining an axial opening 33 and suitable for engaging in or around the lower tube 43. An annular sealing contact, optionally with the aid of an annular bead, enables sealing the connection between the lower tube 43 and the central portion 32, also of tubular shape.

The retaining cap 30 optionally has a skirt J3, parallel and concentric to the central portion 32, which may be fixed to an annular upper end of the second separation unit 20. This skirt J3 optionally is externally supported against the barrier element 21, by radial annular contact.

The lower guide element may be in the form of a radial portion 31, preferably frustoconical, which extends between the central portion 32 and the outer annular edge 35. The radial portion 31 may optionally be perforated with axial openings 37 near an annular lower edge 39 of the piece forming the retaining cap 30 (openings 37 distanced from the central piece 32). Longitudinal connecting arms 34, substantially parallel to one another for example, can connect, from the annular lower edge 39, the lower guide element to the upper guide element. The spaces between the connecting arms form said side openings 36.

Exemplary arrangements, with at least a replaceable portion or replaceable cartridge, will now be discussed with reference to FIGS. 1, 4, and 6.

The filtration device 1 shown in FIG. 1 allows unscrewing the cover 2c. According to one option, it is thus possible to extract at least the partitioning element 9 and the first separation unit 10. An operator can thus selectively change the first separation unit 10.

In a variant, the lower stage 8 may optionally be designed as a detachable element, for example by being associated with a bowl component which includes the bottom wall 2a and a portion of the side wall 2b which extends under the protrusion 25. In this case, unlike the one-piece bowl illustrated in FIG. 4, an operator can selectively unscrew or disassemble the bowl component in any manner in order to separate the lower stage 8 and replace both the bowl component and the second separation unit 20. This system makes it possible to keep a stationary portion forming the upper part of the bowl 50 and thus to preserve the protrusion and the associated guide pieces 54.

In the illustrated option or in similar options, the housing 2 may be arranged to allow the insertion of all the separation means (10, 20, 30), as one unit. In this case, it is understood that the first separation unit 10, the retaining cap 30 or similar member, and the second separation unit 20 are interconnected with each other, typically by superposition, so as to form a filter cartridge 60 mounted as one unit into the internal volume V of the housing 2. Typically, the guide piece or pieces 54 (possibly reusable) can also be removed with the cartridge 60. In this case, a removable design of the portion (FG, 53) which supplements the outer housing wall to form the groove G may be provided, possibly by making it integral with the partitioning element 9.

With reference to FIG. 6, the filter cartridge 60 may form a distinct unit of an extractable basket or other type of casing to which the magnets or similar magnetic members M are integrally secured. A basket design with magnets removably attached to the basket can allow easy removal of the disposable tank R8 (filled with particles/dust) and reuse of the magnets in the new replacement cartridge.

Referring now to FIG. 7, it can be seen that the housing 2 can be attached to a leg 91 of a suspension shock absorber 90. The fastening members 92 can be distributed in one or more attachment areas. The axis of the filter (and the longitudinal axis X of the filter medium 6) are substantially vertical, to take advantage of the gravitational effect. The housing 2 may be placed entirely above or partly above the axis Y of rotation of the rotor disc D (brake disc). There remains sufficient access, along a spring of the shock absorber 90 for example, to be able to remove the cover 2c and make a replacement when necessary without removing the entire bowl 50 (without disassembly at the fastening members 92). Alternatively, an operator can unmount the entire filter and then replace all or part of the device 1 before reattaching the filter to its support on the machine/vehicle.

The device, coupled with a suction system, can prevent rapid fouling of the wheel rims by braking residues and renders the brake assembly 7 non-polluting in comparison to conventional braking systems that have no dust collection and treatment device.

It should be obvious to those skilled in the art that the present invention allows embodiments in many other specific forms without departing from the scope of the invention as claimed. Thus, the bowl 50 and the substantially bell-shaped cover 2c may be designed and/or assembled together differently. The assembly of these elements may be done using any suitable method of attachment, screwing corresponding to a preferred (but non-limiting) option for making the assembly of the device 1 particularly simple and robust. In addition, the cover 2c may be formed by a wall that is part of a functional component, for example a turbine or other means for suctioning clean air and forming the outlet 4.

Furthermore, it is understood that the options for arranging the respective separation units 10, 20 or other complementary elements are usable independently of the complete structure retained for the device as a whole. Thus, the features and structures described in detail for filtering the water can be considered as simple options to supplement the teachings of filtering the air by allowing the heaviest dust to fall to a lower stage 8, just as the features and structures described in detail for guiding and filtering the air centripetally may be considered as a non-limiting option for filtering the air in a filter combining an air filtration medium and a second separation unit in a lower stage 8.

The invention claimed is:

1. A filtration device for filtering brake dust and particles, intended to collect dust and particles produced by one or more pads of a brake assembly, the filtration device comprising:

a housing having an inlet for the intake of an air flow loaded with brake dust and particles and an outlet for the discharge of purified air;

a separation assembly for retaining the dust and particles, the separation assembly comprising:
- a first separation unit, housed in the housing and enabling the separation of dust and particles, the first separation unit comprising a filtering element provided with a filter medium and defining an upstream zone in communication with the inlet and a downstream zone in communication with the outlet, the upstream zone also being in communication with a lower stage located lower than the first separation unit, air entering via the inlet circulating through the filter medium to reach the downstream zone, in a centripetal direction of filtration, and
- a second separation unit, located in the lower stage, enabling the separation of water from the dust and particles that have fallen from the upstream zone, the second separation unit being configured for filtering the water by retaining dust and particles;
- a collection compartment for separated water, located in the lower stage; and
- a water discharge valve suitable for causing the water to flow selectively from the downstream zone to the collection compartment.

2. The filtration device according to claim 1, wherein the water discharge valve is part of water discharge means that are:
- suitable for discharging the water downwards, in other words in the direction of gravity, and
- formed separately from the outlet for discharging purified air.

3. The filtration device according to claim 1, wherein the second separation unit comprises the collection compartment, the lower stage further forming a tank for trapping dust which is separated from said collection compartment by a dust barrier element.

4. The filtration device according to claim 2, wherein the second separation unit comprises the collection compartment, the lower stage further forming a tank for trapping dust which is separated from said collection compartment by a dust barrier element, and wherein the barrier element is annular and internally defines a central internal volume of the lower stage, the water discharge means comprising:
- a purge port for emptying the collection compartment, and
- a first closure member, movable between a position that closes the purge port and a position that opens the purge port.

5. The filtration device according to claim 4, wherein the water discharge means comprise a second closure member, able to place the downstream zone and the central internal volume in communication, in an open configuration of the second closure member, the second closure member belonging to the water discharge valve.

6. The filtration device according to claim 1, wherein in the separation assembly, the first separation unit is superimposed on the second separation unit, the separation assembly being formed as a filter cartridge mounted as one unit within the internal volume of the housing.

7. The filtration device according to claim 1, wherein the filter medium of the first separation unit is suitable for retaining light dust, in particular loaded with little or no metal, the first separation unit further comprising:
- a pre-separator member, located in the upstream zone and surrounding the filter medium, forming a perforated or openworked annular deflector in order to be permeable to light dust, the outer face of the annular deflector being suitable for guiding towards the lower stage the heavy materials that are less volatile than light dust, in particular heavy dust loaded with metal and liquid droplets.

8. The filtration device according to claim 1, wherein the separation assembly comprises a retaining cap capping the second separation unit and forming an interface between the lower stage and an annular portion of the upstream zone surrounding the first separation unit, the retaining cap having:
- an outer annular edge that is distal to a central axis of the filter medium, the outer annular edge, and
- a central portion defining an axial opening and suitable for attachment to at least one among the first separation unit and the second separation unit.

9. The filtration device according to claim 8, wherein the retaining cap has a radial portion, which extends between the outer annular edge and the central portion, and wherein a tank for trapping brake dust and particles is formed in the lower stage between the retaining cap and a bottom wall of the housing.

10. A brake assembly comprising:
- the filtration device according to claim 1,
- a caliper bracket,
- a rotor disk rotating about an axis,
- at least two movable pads intended to press on the rotor disc in order to brake it with a clamping force provided by a bracket, the pads comprising friction material capable of releasing particles resulting from abrasion,
- a collector device at least partly arranged close to the caliper bracket, the collector device comprising:
 - at least one inlet, and
 - a connecting element, connected to an outlet of the collector device and in communication with the inlet of the filtration device.

11. The brake assembly according to claim 10, wherein the collector device has a suction system at least partly arranged close to the caliper bracket, so that each inlet of the collector device is formed by a suction zone formed in the vicinity of each pad and delimited by a deflector.

12. The filtration device according to claim 1, wherein the inlet formed by the housing defines a hollow tube on which is fixed a connecting hose for connection to a brake dust collector device, the housing being attached to a leg of a suspension shock absorber.

13. The filtration device according to claim 1, wherein the lower stage of the filtration device is configured to keep brake dust and particles around the second separation unit and under a retaining cap inserted into the housing.

14. The filtration device according to claim 1, comprising:
- a collection compartment for separated water, located in the lower stage;
- water discharge means to discharge outside the filtration device the separated water collected in the collection compartment.

15. A filtration device for filtering brake dust and particles, intended to collect dust and particles produced by one or more pads of a brake assembly, the filtration device comprising:
- a housing having an inlet for the intake of an air flow loaded with brake dust and particles and an outlet for the discharge of purified air; and
- a separation assembly for retaining the dust and particles, the separation assembly comprising:
 - a first separation unit, housed in the housing and enabling the separation of dust and particles, the first separation unit comprising a filtering element provided with a filter medium and defining an upstream zone in communication with the inlet and a downstream zone in communication with the outlet, the upstream zone also being in communication with a lower stage located lower than the first separation unit, air entering via the inlet circulating through the filter medium to reach the downstream zone, in a centripetal direction of filtration, and a second separation unit, located in the lower stage, enabling the separation of water from the dust and particles that have fallen from the upstream zone, the second separation unit being configured for filtering the water by retaining dust and particles, wherein the separation assembly is further provided with a retaining cap capping the second separation unit and comprising:

at least one first guide element for guiding radially inward the dust and particles falling from the portion of the upstream zone that surrounds the first separation unit, at least one second guide element for guiding radially outward the dust and particles that have been guided by the at least one first guide element.

16. A filtration device for filtering brake dust and particles, intended to collect dust and particles produced by one or more pads of a brake assembly, the filtration device comprising:

a housing having an inlet for the intake of an air flow loaded with brake dust and particles and an outlet for the discharge of purified air; and a separation assembly for retaining the dust and particles, the separation assembly comprising:

a first separation unit, housed in the housing and enabling the separation of dust and particles, the first separation unit comprising a filtering element provided with a filter medium and defining an upstream zone in communication with the inlet and a downstream zone in communication with the outlet, the upstream zone also being in communication with a lower stage located lower than the first separation unit, air entering via the inlet circulating through the filter medium to reach the downstream zone, in a centripetal direction of filtration, and a second separation unit, located in the lower stage, enabling the separation of water from the dust and particles that have fallen from the upstream zone, the second separation unit being configured for filtering the water by retaining dust and particles, wherein the second separation unit comprises or is surrounded by one or more magnetic members which are suitable for attracting dust and particles in order to retain them below the inlet and below the first separation unit.

17. The filtration device according to claim 16, wherein the one or more magnetic members are adjacent to a bottom wall of the housing and/or contiguous to a side wall of the housing defining an internal volume of the housing in which the separation assembly is entirely housed.

\* \* \* \* \*